United States Patent [19]

Tamarkin

[11] Patent Number: 5,385,653
[45] Date of Patent: Jan. 31, 1995

[54] METHOD OF AND DEVICE FOR INDUSTRIAL WASTE WATER TREATMENT

[76] Inventor: Semyon Tamarkin, 11 Lincoln Ave., West Orange, N.J. 07052

[21] Appl. No.: 149,090
[22] Filed: Nov. 9, 1993
[51] Int. Cl.⁶ .............................................. C02F 1/463
[52] U.S. Cl. ................................... 204/150; 204/249
[58] Field of Search ...................... 204/150, 249, 248

[56] References Cited

U.S. PATENT DOCUMENTS

| | | | |
|---|---|---|---|
| 1,514,737 | 11/1924 | Smith | 204/150 |
| 3,392,102 | 7/1968 | Koch | 204/150 |
| 3,394,064 | 7/1968 | Fowkes et al. | 204/150 |
| 4,525,254 | 6/1985 | Feofanov et al. | 204/150 |

Primary Examiner—John Niebling
Assistant Examiner—Arun S. Phasge
Attorney, Agent, or Firm—I. Zborovsky

[57] ABSTRACT

Waste water is purified by passing through a vessel in which small coal particles interact with metal to form galvanic couples which produce ions of Fe. These ions are involved in chemical reduction of ions of heavy metals and formation of a coagulating agent, which removes impurities from waste water. Pressurized air can saturate the waste water simultaneously with passing through the vessel with metal in order to produce process floatation using Fe(OH)$_2$ as a coagulant.

6 Claims, 1 Drawing Sheet

METHOD OF AND DEVICE FOR INDUSTRIAL WASTE WATER TREATMENT

BACKGROUND OF THE INVENTION

The present invention relates to a method of and a device for treatment of electroconductive waste water.

More particularly, it relates to a method and a device for treatment of waste water which have a relatively high electroconductivity resulting from the presence in them of inorganic acids, alkalis and salt.

They are especially recommended for waste water a) from galvanic processes during chemical and electrochemical treatment of steel (chromizing, passivation, etching, etc.), b) from production of microelectronic elements such as printed circuit, e) for waste water containing hydroxides of heavy metals, d) for waste water containing oil, fat, petroleum, products of organic synthesis, paints, finely dispersed suspended products, and products having a hydraulic size up to 0.01 mm/sec, as well as for combinations of the above.

Methods of and device for waste water treatment are known in many modifications. It is advisable to provide new and improved methods and devices of this type.

SUMMARY OF THE INVENTION

Accordingly, it is an object of the present invention to provide a method of and a device for treatment of electroconductive waste water which are further improvements of existing methods and devices.

In keeping with these objects and with others which will become apparent hereinafter, one feature of the present invention resides, briefly stated, in a method and a device in which correspondingly steps and means are provided for supplying coal particles, mixing the coal particles with metal particles so as to form galvanically produced coagulating agent, and passing waste water through the thusly produced coagulating agent so as to absorb impurities from the waste water. The new method and device thus involve a galvanocoagulation of the impurities.

In accordance with another feature of the present invention, pressurized air saturates the waste water simultaneously with the galvanocoagulation, so that the galvanocoagulation is combined with a pressure floatation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
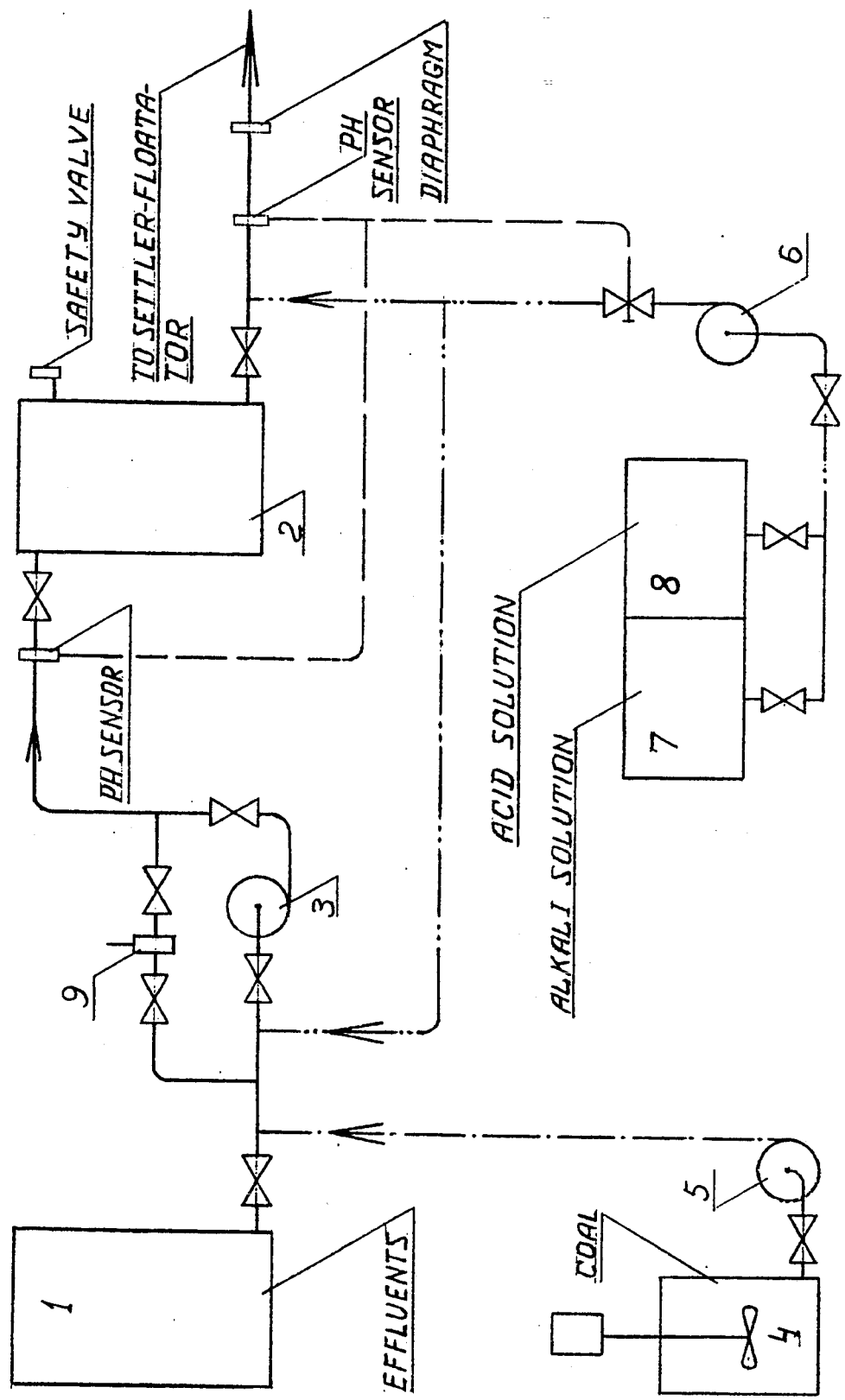
FIG. 1 is a view schematically showing a method and a device for industrial waste water treatment in accordance with the present invention.

In accordance with the present invention, waste water which has to be purified is mixed with a solution of small particles of coal. Then the waste water is supplied into a pressure vessel loaded with metal, for example metal chip produced during machining. The small coal particles form with the metal a lot of galvanic couples. During this process, chemical reduction of ions of heavy metals in the waste water by ions $Fe^{+2}$ formed during electrochemical dissolution of anodes (metal chips) and also by hydroxide $Fe(OH)_2$ formed in the waste water by interaction of $Fe^{+2}$ and $OH^-$ occurs.

For example for chromium the reaction is as follows:

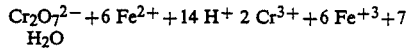

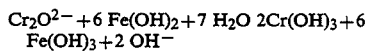

The ferrous hydroxide is an excellent coagulating agent which absorbs impurities contained in the waste water.

For waste water, which contains oil, fat, petroleum products, finely dispersed suspended particles, ions of heavy metals, etc., the galvanocoagulation is combined with pressure floatation.

After treatment by galvanocoagulation alone or in combination with pressure floatation, the waste water is supplied to clarifier, or to clarifier-floatators, etc., which are well known and provide settling of hydroxides of heavy metals, removal of sediment, etc.

The operation parameters are selected in accordance with initial characteristics of the waste water.

An example of the present invention is given hereinbelow for treatment of waste water from conventional galvanic production of printed circuits which predominantly contain ions of hexavalent chromium.

As can be seen from FIG. 1 the waste water from a receiving reservoir 1 is supplied by a pump 3 into a pressure vessel 2. pH of the waste water must be not less than 5.5 before the pressure vessel and 8-10 after the pressure vessel (natural growth pH after the vessel is 1–4). If it is necessary the waste water is adjusted by supplying corresponding pH adjusting agents from vessels 7 and 8 by a pump 6 in automatic mode.

A solution of small particles of coal with the size of 0.4 mm and less is supplied into a suction line of the pump 3 by pump 5. Coal can be charged into a tank with a stirrer 4 once per 1 shift. The solution in the tank is prepared with the initial waste water. In order to remove from the waste water 1 g of cadmium, nickel, chromium (hexavalent) it is 3.5–6.5 g. In order to remove fluorine ions an aluminum charge can be used with 2–6 g of aluminum per 1 g of fluorine to be removed. The time of passage of the waste water through the pressure vessel is 1–5 min depending on the initial concentration, and the speed is approximately 2 m per 1 min. This is the time and speed of galvanocoagulation.

Thereafter the waste water is supplied to conventional clarifier or clarifier-floatators for removal of hydroxides of heavy metals, treatment of the sediment, etc. The purification degree reaches 99%.

In accordance with another embodiment of the invention, the galvanocoagulation is combined with a pressure floatation. This method is recommended for waste water in point d) (page 2).

As shown in FIG. 1, the waste water is supplied from a reservoir 1 by a pump 3. An ejector 9 supplies air with the volume equal to 3–5% of the volume of the waste water to be treated. Also a solution of small coal particles with the quantity of 1.5–6 g per 1 g of impurities to be removed is supplied by the pump 5. If necessary pH of the waste water can be adjusted by supplying of pH adjusting agent from the tanks 7 and 8 to maintain pH within 5.5–10. The time of contact of waste water with the galvanocoagulation pressure vessel is not less than 1–2 min. The consumption of metal is 2–6 g per 1 g impurities to be removed. Two processes occur in the pressure vessel, namely:

Process of saturation of waste water with air under pressure; and

Process of galvanocoagulation with chemical reduction of ions of heavy metals and formation of hydroxide of iron $Fe(ON)_2$ acting as a coagulant.

Before the clarifiers-floatators a diaphragm is provided in order to reduce pressure and form and expand air bubbles with further continuation of the process on the clarifiers-floatators.

The inventive method and device for galvanocoagulation have several advantages when compared with conventional electrocoagulation, in particular they do not use electricity, they provide more intensive chemical processes due to larger electrode surfaces as a result of contact of a great number of coal particles with metal and due to pressure conditions and therefore have substantially higher output, they have a simpler and better adjustable technological process, the cost of purification of 1 $m^3$ of waste water is 20–30% lower. With the use of the combined approach including the galvanocoagulation and pressure floatation the costs are reduced by 30–50% relative to the conventional methods.

The invention is not limited to the details shown, since various modifications and structural changes are possible without departing in any way from the spirit of the present invention.

What is desired to be protected by Letters Patent is set forth in the appended claims.

It is claimed:

1. A method of treatment of electroconductive waste water, comprising the step of loading a vessel with metal particles;

pumping waste water to the vessel though a line;

supplying coal particles into the line through which the waste water is pumped to the vessel; and passing the coal particles with waste water through the vessel loaded with metal particles to form galvanic couples to produce $Fe^{+2}$ which provide chemical reduction of ions of heavy metals and formation $Fe(OH)_2$ to form a coagulating agent which absorbs impurities contained in the waste water.

2. A method as defined in claim 1; and further comprising the step of supplying pressurized air into the line through which the waste water is dumped to the vessel in order to make more intensive process of treatment.

3. A method as defined in claim 1; and further comprising the step of removing the coagulating agent from the waste water.

4. A device for treatment of electroconductive waste water, comprising vessel means for accommodating metal particles;

pumping means for pumping waste water to said vessel means through a line;

means for supplying coal particles into said line through which the waste water is pumped to the vessel so that the coal particles with waste water pass through said vessel with metal particles so as to form galvanic couples to produce $Fe^{+2}$ which provide chemical reduction of ions of heavy metals and formation $Fe(OH)_2$ to form a coagulating agent which absorbs impurities from the waste water.

5. A device as defined in claim 4; and further comprising means for for supplying pressurized air into said line through which the waste water is pumped to said vessel.

6. A device as defined in claim 4; and further comprising means for removing the coagulating agent from the waste water.

* * * * *